2 Sheets—Sheet 1.

C. C. ALGER.

Blast Furnace.

No. 677.

Reissued Mar. 29, 1859.

Witnesses:

Andrew De Lay

Wm. H. Burhop

Inventor:

Chas. C. Alger

AM. PHOTO-LITHO. CO. N.Y. (OSBORNE'S PROCESS.)

2 Sheets—Sheet 2.

C. C. ALGER.

Blast Furnace.

No. 677.

Reissued Mar. 29, 1859.

Witnesses:

Andrew De Lacy

Wm H Ashton

Inventor:

Chas. C. Alger

AM. PHOTO-LITHO. CO. N.Y. (OSBORNE'S PROCESS.)

UNITED STATES PATENT OFFICE.

CHARLES C. ALGER, OF NEWBURG, NEW YORK.

IMPROVED SMELTING-FURNACE.

Specification forming part of Letters Patent No. 17,659, dated June 30, 1857; Reissue No. 677, dated March 29, 1859.

*To all whom it may concern:*

Be it known that I, CHARLES C. ALGER, of Newburg, in the county of Orange and State of New York, have invented a new and Improved Furnace for Smelting or Melting Ores or Metals; and I do hereby declare that the same is fully described and represented in the following specification and the accompanying drawings, of which—

Figure 1:
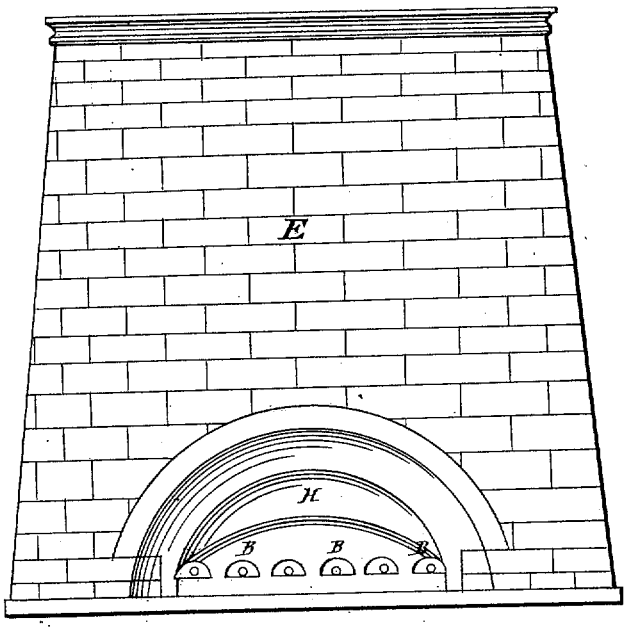
Figure 2:
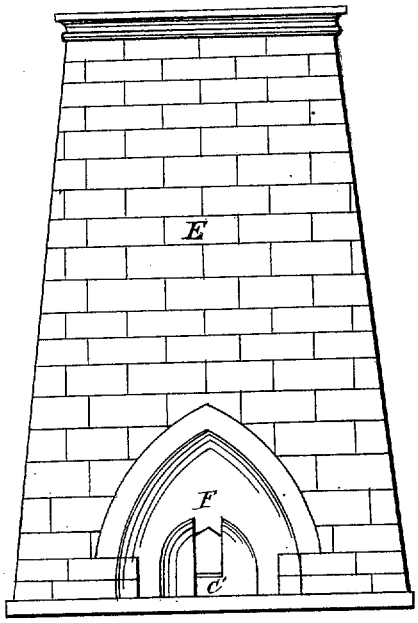
Figure 5:
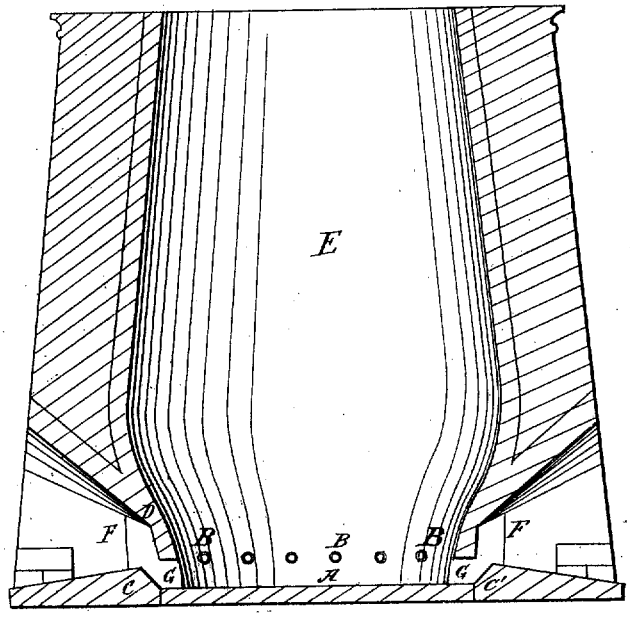
Figure 6:
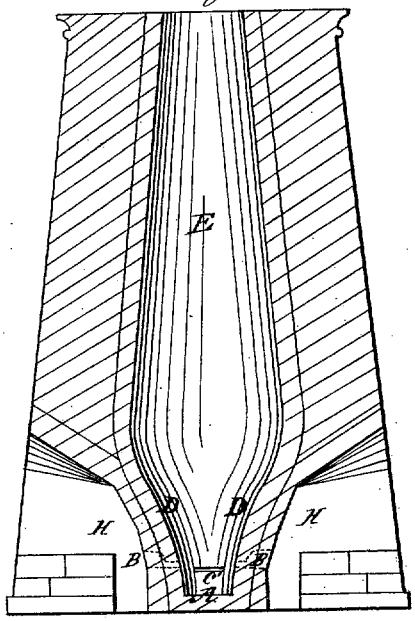
Figure 3:
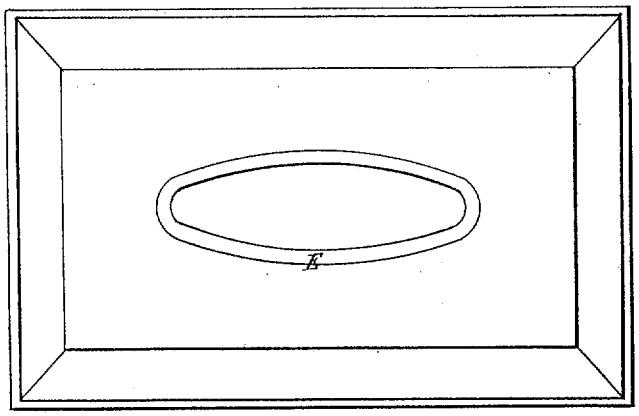
Figure 4:
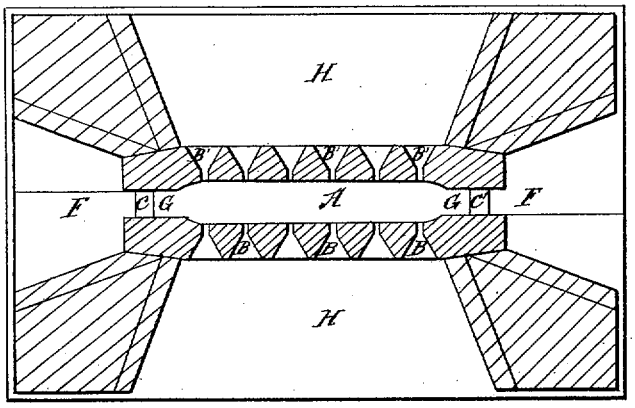
Figure 7:
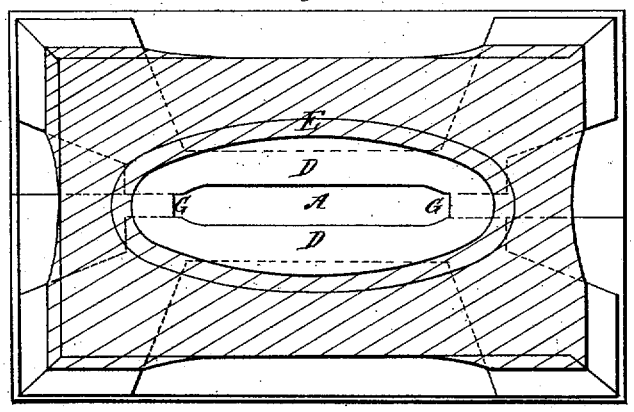

Figure 1 is a side elevation of said furnace; Fig. 2, an end elevation of it; Fig. 3, a plan or top view of it; Fig. 4, a horizontal section taken through its tuyere-passages; Fig. 5, a vertical central and longitudinal section of it; Fig. 6, a vertical and transverse section, the same being taken through the tuyere-passages of opposite sides of the furnace. Fig. 7 is a horizontal section taken at the top of the boshes.

Blast-furnaces, say, for smelting iron ores have always been constructed of a square, polygonal, or circular form in their horizontal sections through either the hearth or crucible, and as it is necessary to the proper working of a furnace that the blast of air should penetrate the whole charge equally, experience has demonstrated that with heavy coal—such as anthracite—a diameter or width of about six feet in the hearth is the maximum limit of capacity for the proper working of such furnaces. In order to make good iron, even with that capacity, a blast of from four to five pounds pressure to the square inch (such depending on the quality of this kind of coal) is necessary, the great weight of this coal admitting of such pressure; but with lighter fuel—such as charcoal, bituminous coal, and coke—which is easily lifted and the fine particles forced up by the blast and lodged on the boshes, and which therefore does not admit of a blast of such heavy pressure, the furnace cannot be advantageously made so large as six feet in width or diameter of hearth; and with the proportions indicated, the use of a blast of heavy pressure is attended with serious inconvenience, on account of the expansion which the air undergoes in the cavities or openings of the charge, as such occasions inequality in the distribution of the blast of air. The main objection, however, arises not only from the great cost of machinery and power to produce and maintain a uniform blast under such heavy pressure, but from an increased consumption of fuel, all of which adds greatly to the cost of erecting and running furnaces under such conditions. It is the general belief of intelligent and practical iron-masters that the relative proportions of the hearth to the boshes should be about as one to three, and that the diameter of the hearth should not much exceed six feet to work with economy and produce the best effects. The product cannot be increased with economy by increasing the diameter or width of the hearth much beyond six feet, because that necessitates at times a still greater increase of pressure beyond five pounds, and such increase of pressure would not only be attended with a still greater proportional consumption of fuel, but, besides, it is liable to injure the quality of the product, causing all that which is melted at or near the tuyeres to be hard, however well the materials may be prepared, or to be otherwise injured or wasted. Besides this difficulty, a blast of over five pounds pressure is liable to injure the strength of the metal; and if the hear h or crucible is increased in diameter or width much beyond six feet, whenever the furnace loses its required heat, which often occurs, a hard mass is liable to form on or about the middle or back wall of the hearth below the tuyeres, to the great detriment of the process. These masses, when once formed, remain for a great length of time after the furnace is brought back to the temperature required for obtaining good results. For the reason above stated, it has universally been recognized that there is a practical limit to the capacity of such furnaces, and although it has long been known that it would be a source of great economy if the capacity of furnaces could be materially increased in some way suitable to the production of good results, with the blast not exceeding the pressure usually employed, yet prior to my invention no plan, to my knowledge, has been produced which would accomplish the desideratum.

The object of my invention has been to produce a furnace having a capacity materially increased beyond that of furnaces as heretofore constructed, and at the same time preserving what are recognized as the proper relations of the blast to the charge; and to this end my invention consists in making the furnace of an elliptical or oblong form in the planes of its horizontal sections, from and including the hearth or crucible upward, and also having two mouths—one at each end of the hearth—and arranged for the introduction of the blast at the sides, so as to introduce the blast in the direction of the breadth of the hearth.

In the accompanying drawings, which represent my said invention as applied to a blast-furnace for smelting iron ore, A represents the hearth or crucible, which is of an elliptical or oblong form in the plane of its horizontal section, but in all other respects formed in the usual manner.

B B B B′ B′ B″ are two series of tuyere arches or openings, one on each side, and arranged between the main working-arches H H. To these tuyere arches are fitted tuyeres and blast-pipes in the usual manner, in order to introduce the blasts in the direction of the breadth of the hearth.

C C′ are the dam-stones, D D the boshes, and E the stack, bearing the same proportions to the hearth, so far as breadth is concerned, that they do in furnaces of the usual form.

F F are arches—one at each end—for the working-mouths G G.

I contemplate in some instances employing two ranges of tuyeres, one above the other.

H H are main arches leading to the lower or tuyere arches.

The boshes, as well as the stack, are of an oblong or elliptical form, and in all other respects bear the same relations in form to the hearth that they do in furnaces of the usual construction. The breadth of the hearth is to be determined by the kind of fuel and the pressure of the blast, with the view to the quality of the iron to be produced and economy of fuel, the length of the hearth being due to the quantity of iron which it may be desirable to smelt within a given time.

It will be seen from the above that in my improved plan the capacity of the furnace can be materially increased without changing the relations of the blast to the charge—a result which cannot be obtained, as I believe, by any other known method—thus inducing economy, as it is well known that the greater the quantity of material and fuel which can be in preparation at one time the less will be the relative cost of the process, as the labor and number of keepers will be much less in proportion to the product, which, under such proportions, will produce more soft iron with less fuel if applied to a furnace for smelting iron ore; and so of other products when applied to other ores or to metals.

What I claim as my invention, and desire to secure by Letters Patent, is—

1. Constructing furnaces with the hearth and boshes of an elliptical or elongated form, substantially as described, in combination with the application of the blast at the sides, so arranged as to introduce the blast in the direction of the breadth, and for the purposes specified.

2. In combination with the hearth and boshes made of an elliptical or elongated form, substantially as described, the construction of such furnaces with two mouths—one at each end—for working and tapping, substantially as and for the purpose specified.

CHAS. C. ALGER.

Witnesses:

ANDREW DE LACY,
WM. H. BISHOP.